United States Patent
Shyamalan

(10) Patent No.: US 9,774,990 B2
(45) Date of Patent: Sep. 26, 2017

(54) PROXIMITY-BASED VERIFICATION OF PROGRAMMING INSTRUCTIONS

(71) Applicant: Verizon Patent and Licensing Inc., Basking Ridge, NJ (US)

(72) Inventor: Shyam T. Shyamalan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/692,012

(22) Filed: Apr. 21, 2015

(65) Prior Publication Data

US 2016/0316419 A1    Oct. 27, 2016

(51) Int. Cl.

| | |
|---|---|
| *H04B 7/00* | (2006.01) |
| *H04M 11/04* | (2006.01) |
| *H04M 1/00* | (2006.01) |
| *H04W 4/02* | (2009.01) |
| *H04W 8/00* | (2009.01) |
| *H04W 12/00* | (2009.01) |
| H04W 8/20 | (2009.01) |

(52) U.S. Cl.
CPC ............ *H04W 4/02* (2013.01); *H04W 8/005* (2013.01); *H04W 12/00* (2013.01); H04W 8/20 (2013.01)

(58) Field of Classification Search
CPC ... H04W 48/16; H04W 76/023; H04W 84/12; H04W 4/008; H04W 4/023; H04W 84/18; H04W 84/20; H04W 88/06; H04B 1/385; H04M 1/7253

USPC .......................... 455/41.2–41.3, 575.6, 404.1
See application file for complete search history.

(56) References Cited

U.S. PATENT DOCUMENTS

| | | | |
|---|---|---|---|
| 9,398,007 B1* | 7/2016 | Wegener | H04L 63/0861 |
| 2006/0172736 A1* | 8/2006 | Nevo | H04W 48/18 455/435.1 |
| 2009/0323659 A1* | 12/2009 | Zhang | H04W 76/023 370/338 |
| 2011/0214158 A1* | 9/2011 | Pasquero | G06F 21/35 726/2 |
| 2012/0100803 A1* | 4/2012 | Suumaki | H04W 36/0072 455/41.1 |
| 2015/0067516 A1* | 3/2015 | Park | G06F 3/167 715/728 |
| 2015/0288682 A1* | 10/2015 | Bisroev | G06F 3/0481 713/172 |
| 2015/0326704 A1* | 11/2015 | Ko | H04M 1/7253 455/456.3 |
| 2015/0358451 A1* | 12/2015 | Cronin | H04B 1/385 455/420 |

(Continued)

*Primary Examiner* — Simon Nguyen

(57) ABSTRACT

A mobile device, such as a smart phone, generates instructions for a user device, such as a wearable device for a child. The mobile device initiates a local network associated with an attribute, and the user device may access the local network using the attribute when the user device is within a threshold distance of the mobile device. The mobile device generates program data identifying the instructions and the local network attribute, and mobile device forwards the programming data to the user device via another network. For example, the mobile device may generate a short messaging service (SMS) message that includes the programming data. The user device executes the instructions when the user device is able to communicate with the mobile device via the local network.

20 Claims, 7 Drawing Sheets

(56) References Cited

U.S. PATENT DOCUMENTS

| | | | |
|---|---|---|---|
| 2016/0034696 A1* | 2/2016 | Jooste | G06F 1/163 |
| | | | 726/1 |
| 2016/0058133 A1* | 3/2016 | Fournier | H04B 1/3888 |
| | | | 455/41.2 |
| 2016/0147264 A1* | 5/2016 | Kil | G06F 1/1626 |
| | | | 345/173 |
| 2016/0198304 A1* | 7/2016 | Oh | H04W 4/023 |
| | | | 455/41.3 |
| 2016/0379205 A1* | 12/2016 | Margadoudakis | G06Q 20/327 |
| | | | 705/71 |

* cited by examiner

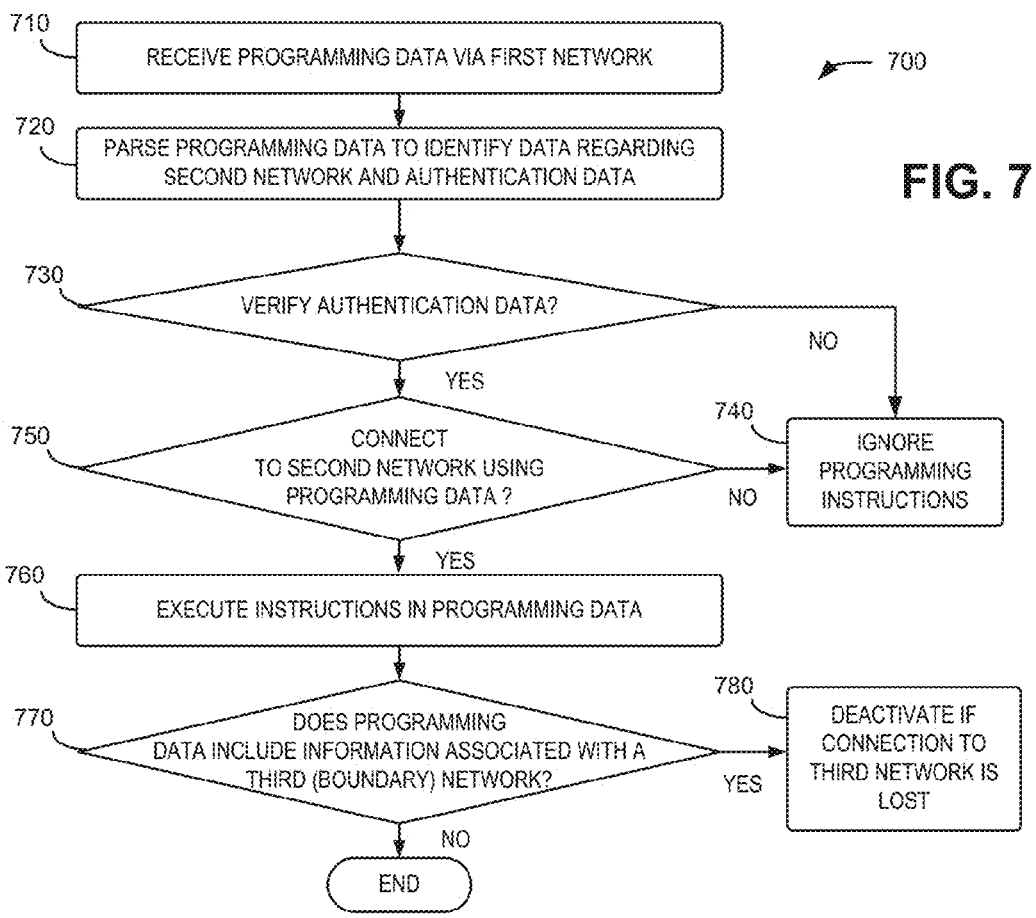

PROXIMITY-BASED VERIFICATION OF PROGRAMMING INSTRUCTIONS

BACKGROUND INFORMATION

Devices may wirelessly communicate over short distances (e.g., within a few meters) using a wireless network. Devices may communicate over a wireless network using, for example, radio signals (e.g., Bluetooth® or Wi-Fi®) and/or infrared signals (e.g., Infrared Data Association, or IrDA). In a wireless network, two devices may pair (e.g., establish a wireless connection) to exchange data when brought in proximity of one another.

BRIEF DESCRIPTION OF THE DRAWINGS

FIG. 7 is a flowchart of a process for authenticating and using received programming data in the environment of FIG. 1.

DETAILED DESCRIPTION OF PREFERRED EMBODIMENTS

The following detailed description refers to the accompanying drawings. The same reference numbers in different drawings identify the same or similar elements.

In certain implementations, a mobile device, such as a smart phone, generates instructions for a user device, such as a wearable device for a child. The mobile device establishes a local network associated with an attribute such as a service set identifier (SSID), and the user device may access the local network using the attribute when the user device is within a threshold distance of the mobile device. The mobile device generates program data identifying the instructions and the local network attribute and forwards the programming data to the user device via another network. For example, the mobile device may generate a short messaging service (SMS) message that includes the programming data. The user device executes instructions identified by the data when the user device is able to communicate with the mobile device via the local network. The data may further identify an attribute (such as an SSID) of a wireless network, and the instructions may cause the user device to deactivate itself if the user device cannot access the wireless network based on the attribute (e.g., when the user device moves outside a boundary of the wireless network).

Figure 1:
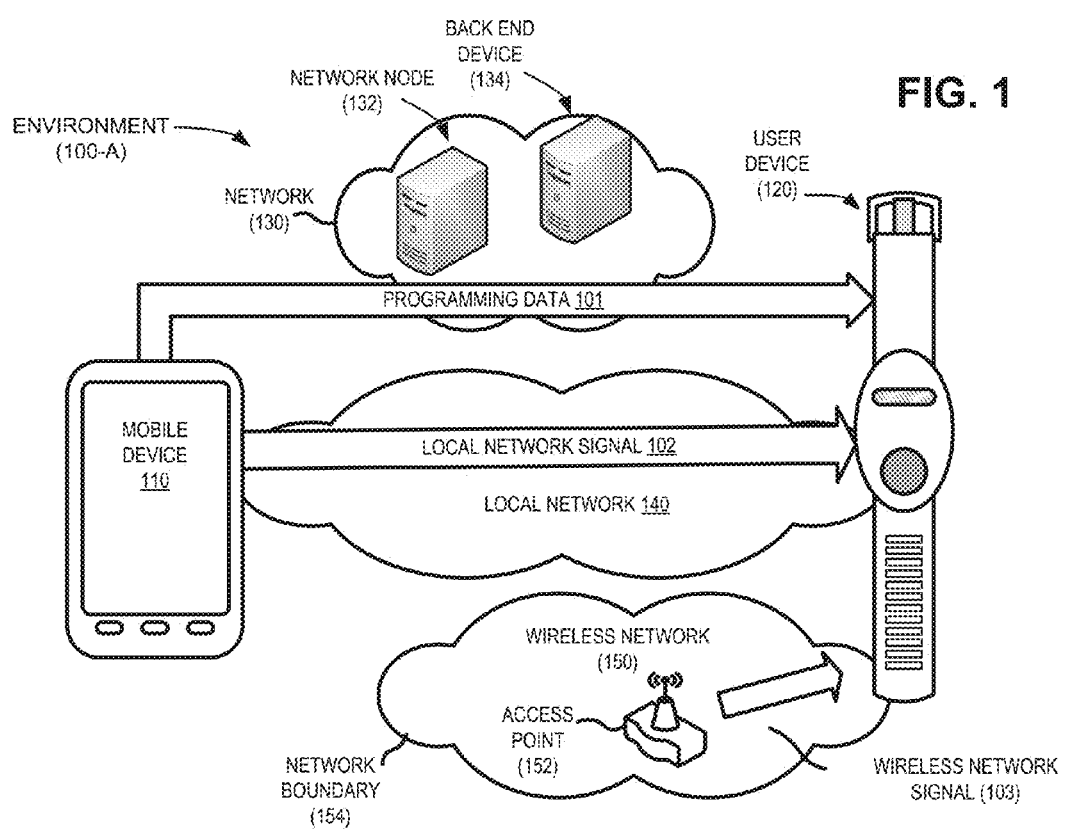
FIG. 1 is a diagram illustrating an exemplary environment according to implementations described herein.

FIG. 1 is a diagram showing an exemplary environment 100 in which the systems and/or methods, described herein, may be implemented. As shown in FIG. 1, environment 100 may include a mobile device 110 that forwards: (i) a programming data 101 via a network 130, which may include a network node 132 and/or a back end device 134; and (ii) a local network signal 102 via a local network 140 to a user device 120. As further shown in FIG. 1, environment 100 may further include a wireless network 150, which is identified to user device 120 in programming data 101. Wireless network 150 may include access point 152 that provides wireless network signals 103 to user device 120.

In implementations described herein, mobile device 110 may refer to a device that is capable of forwarding programming data 101 to user device 120 via network 130. For example, mobile device 110 may generate a short messaging system (SMS) message, (such as a text message), an electronic mail, or other communication that is forwarded to user device 120 via network node 132. For example, mobile device 110 may include a portable communication device such as a smart phone. In other implementations, mobile device 110 may include a phablet device, a global positioning system (GPS) device, and/or another type of wireless device; a laptop, tablet, or another type of portable computer; a media playing device; a portable gaming system; and/or any other type of mobile computer device with communication and output capabilities.

As described in greater detail below, programming data 101 may include, for example, (i) data that identify one or more particular devices with which user device 120 is authorized to communicate; and (ii) authentication data that may be used by user device 120 to verify that programming data 101 is sent from mobile device 110 and that mobile device 110 is authorized to provide programming data 101. Programming data 101 may include, for example, a mobile directory number (MDN) or other telephone number, a media access control (MAC) address, an internet protocol (IP) address, a mobile equipment identifier (MEID), etc. that may be used by user device 120 to initiate a voice call to a particular device (e.g., to mobile device 110). Authentication data in programming data 101 may include, for example, data identifying mobile device 110 (e.g., an associated MDN, MAC address, IP address, MEID, etc.) and/or data associated with user device 120 (e.g., an associated serial number, pass code, MDN, IP address, MAC address, MEID, etc.). Additionally or alternatively, programming data 101 may include information identifying wireless network 150 and/or access point 152.

Mobile device 110 may be associated with multiple MAC addresses, such as separate MAC addresses for different types of communication protocols, such as a first MAC address (e.g., 48 bit address based on a MAC-48 protocol) for Bluetooth® communications and a second, different MAC address (e.g., an extended unique identifier, or EUI, 48 bit or 64 bit address) for data exchanges via a wireless wide area network (WWAN), such as long term evolution (LTE), 4G, 3G, or another wireless data protocol. Programming data 101 may include data identifying the multiple MAC addresses.

As further described herein, mobile device 110 may generate local network 140. For example, mobile device 110 may establish local network 140 within a specific geographic area. Mobile device 110 may function as a mobile hotspot using one or more of the 802.11x family of networking protocols (e.g., Wi-fi), Bluetooth®, IrDA, to provide local network 140.

Mobile device 110 may include data identifying one or more attributes in programming data 101. Additionally or alternatively, mobile device 110 may control a component (not shown) of local network 140 (such as an access point, a wireless router, signal repeater, etc.) to cause local network 140 to have the one or more attributes identified in programming data 101.

For example, mobile device 110 may establish local network 140 based on a service set identifier (SSID), and mobile device 110 may generate programming data 101 that includes the SSID. Programming data 101 may further include information identifying local network 140 (e.g., a network name, a transmission frequency, an address of a node, etc.) and/or other information that may be used by user device 120 to access local network 140. For example, programming data 101 may include a Wi-Fi protected access (WPA) code or a Wi-Fi protected access II (WPA2) code, under IEEE 802.11i, that is used by mobile device 110 to encrypt local network signal 102.

In one implementation, mobile device 110 may scan other networks that are generated by mobile device 110 or are within a range of mobile device 110 and/or user device 120, to identify SSIDs or other attributes associated with the other networks. Mobile device 110 may select an attribute (e.g., a different SSID) that differs from the attributes of the other adjacent networks and generate local network 140 based on the selected attribute.

In one implementation, mobile device 110 may receive, from a user, information that is to be included in programming data 101. Mobile device 110 may provide an interface, such as a graphical user interface (GUI), that enables the user to input data regarding user device 120 (e.g., a pass code) or data identifying an MDN to be dialed from user device 120.

As used herein, user device 120 may be capable of receiving and parsing programming data 101 to identify information (e.g., MDNs) associated with one or more particular devices (e.g., mobile device 110). User device 120 may further communicate (e.g., place and/or receive a telephone call) only with the one or more particular devices based on the contents of programming data 101. To verify that programming data 101 is received from a legitimate source (and not, for example, from a third-party device that is posing as mobile device 110), user device 120 may use authentication data included in programming data 101 to verify that programming data 101 is received from the legitimate source.

User device 120 may include, for example, a portable communication device such as a mobile phone. In one implementation, user device 120 may include a wearable communications device that is intended for use by a child. User device 120 may include components that limit user inputs, to help prevent the child from using user device 120 to place calls to an unknown device. For example, user device 120 may include a single input button that may be used by the child to initiate a call to one or more particular devices designated by a parent/guardian. For example, user device 120 may place a call to mobile device 110 if the input button is pressed once, and may place a call to another device identified in programming data 101 (not shown). Moreover, user device 120 may include limited ability to output data.

User device 120 may output information identifying its geographic location to one or more devices (e.g., to mobile device 110) via network 130. For example, user device 120 may include hardware, software, or a combination thereof to detect a geographic location of user device 120. In some embodiments, user device 120 may use global positioning system (GPS) technology to determine the geographic location of user device 120. Other suitable location detection technologies also may be used in other embodiments, such as trilateration techniques, to process radio frequency (RF) signals received by user device 120 (e.g., from network 130) and to estimate the geographic location of user device 120.

As further described herein, user device 120 may use data within programming data 101 to verify that programming data 101 is received from mobile device 110 that is geographically close to user device 120 (e.g., within the range of local network 140). For example, user device 120 may receive, as local network signal 102, a connection request or other message from mobile device 110 via local network 140. User device 120 may determine whether an SSID or other attributes associated with local network signal 102 correspond to the attributes identified in programming data 101.

Mobile device 110 may define local network 140 within a specific geographic area that may be referred to as a "hotspot." If user device 120 is located within a region associated with local network 140, user device 120 may connect to mobile device 110 using the SSID (if local network 140 supports Wi-fi) or using other data (if local network 140 supports Bluetooth®, IrDA, or other types of communications). In one implementation, mobile device 110 may identify network technologies compatible with user device 120 based on, for example, communications with user device 120 via network 130, and mobile device 110 may establish local network 140 using one of the compatible network technologies.

Additionally or alternatively, user device 120 may attempt to establish a session with mobile device 110 (or another device) using the SSID and/or other attribute data included in programming data 101. For example, user device 120 may communicate with mobile device 110 to receive additional programming instructions, to confirm receipt of programming data, provide performance results, etc.

When local network 140 is generated by mobile device 110 using Bluetooth®, local network signal 102 may correspond to a Bluetooth® connection request and may include, for example, data identifying a class of device (CoD) (data identifying a device class or type associated with mobile device 110), a list of services offered by mobile device 110, and/or other information identifying features associated with mobile device 110, an associated manufacturer, communications protocols that are accepted by mobile device 110, a clock offset used by mobile device 110, etc.

Network 130 may include any type of network and/or combination of networks. For example, network 130 may include a local area network (LAN), a wireless LAN (WLAN) (e.g., an 802.11 network), a wide area network (WAN) (e.g., the Internet), a wireless WAN (WWAN) (e.g., a 3GPP System Architecture Evolution (SAE) Long-Term Evolution (LTE) network, a Global System for Mobile Communications (GSM) network, a Universal Mobile Telecommunications System (UMTS) network, a Code Division Multiple Access 2000 (CDMA2000) network, a High-Speed Packet Access (HSPA) network, and/or a Worldwide Interoperability for Microwave Access (WiMAX) network, etc.). Additionally, or alternatively, network 120 may include a fiber optic network, a metropolitan area network (MAN), an ad hoc network, a virtual network (e.g., a virtual private network (VPN)), a telephone network (e.g., a Public Switched Telephone Network (PSTN)), a cellular network, a Voice over IP (VoIP) network, or another type of network.

Network 130 may include one or more network nodes 132, such as router, content server, application server, message server, switch, etc. that forward programming data 101. For example, if programming data 101 is included in an SMS message, network node 132 may correspond to a messaging server for identifying a communications path to device 120. Network node 132 may forward programming data 101 via the communications path. In another example, network node 132 may augment programming data 101. For example, if programming data 101 includes a first MDN of a device associated with a user, network node 132 may identify a second MDN of another device associated with the user, and may augment programming data 101 with the second MDN.

In one implementation, network 130 may include a backend device 134 that performs administrative functions for forwarding programming data 101 and/or local network signal 102 associated with local network 140. For example, backend device 134 may correspond to an authentication and/or billing server that receives a request from mobile device 110 to forward a message containing programming data 101 and/or to function to provide a mobile hotspot related to local network 140. For example, backend device 134 may authenticate mobile device 110. If the authentication fails, backend device 134 may block transmission of programming data 101 to user device 120. In another example, backend device 134 may determine (e.g., based on contents of programming data 101) that programming data 101 is being sent and/or local network 140 is being established for the purpose of programming user device 120. Network node 132 may authorize sending programming data 101 or the establishment of local network 140. In yet another example, backend device 134 may enable mobile device 110 to provide a mobile hotspot related to local network 140, but may limit bandwidth on local network 140 so that mobile device 110 may emit local network signal 102 based on an SSID, but does not perform other data exchanges via local network 140. Additionally or alternatively, backend device 134 may instruct mobile device 110 to emit local network signal 102 at a particular power level, frequency, or other transmission attribute that enables user device 120 to identify an SSID and/or other data identifying mobile device 110 at a particular range, while minimizing other data exchanges.

Local network 140 may correspond to a personal area network ("PAN") or other short-range network via which mobile device 110 may communicate with user device 120. For example, mobile device 110 and user device 120 may communicate via Bluetooth®, Wi-Fi, and/or another wireless network. In another example, mobile device 110 and user device 120 may communicate via a near field communication ("NFC"), which may typically be associated with a relatively short range and low bandwidth. Additionally or alternatively, mobile device 110 and user device 120 may communicate via one or more wired connections. For instance, mobile device 110 and user device 120 may communicate via a High Definition Multimedia Interface ("HDMI") cable, an HDMI Mobile High Definition Link ("MHL") cable, or another type of wired connection. In some implementations, the PAN may include an "ad-hoc" network, and in some implementations, the PAN may include one or more central routers, hubs, and/or switches. In some implementations, the PAN may include a portion of a local area network ("LAN"), such as a wireless LAN ("WLAN") (e.g., an 802.11 network).

In other implementations, programming data 101 may identify attributes (e.g., an SSID value, a WPA or WPA2 code, etc.) associated with wireless network 150. Access point 152 may transmit wireless network signal 103 using short-range wireless communications, such as Bluetooth®, Wi-Fi, IrDA, NFC or other wireless communications. Wireless network signal 103 may include, for example, a request to join wireless network 150 and may identify one or more attributes (e.g., the SSID) associated with wireless network 150. When user device 120 is physically located within network boundary 152 (e.g., within transmission range of access point 152), user device 120 may receive, from access point 152, wireless network signal 103. Network boundary 154 may correspond, for example, a periphery of an amusement park, school, playground, commercial establishment, library, or other facility providing wireless network 150. User device 120 may use information included in programming data 101 (e.g., an SSID for wireless network 150) to verify that wireless network signal 103 is received from access point 152 associated with wireless network 150 and not from another network.

User device 120 may attempt to access wireless network signal 103 periodically and/or during different time periods using information included in programming data 101. If user device 120 cannot receive wireless network signal 103 (e.g., user device 120 has moved outside of network boundary 154), user device 120 may perform one or more actions. For example, user device 120 may automatically (e.g., without receiving a user input) initiate a call and/or send an alert message (e.g., via network 130) to mobile device 110 or to another device (e.g., to a police or school official) to indicate that user device 120 has left a geographic area associated with network boundary 154. In another example, if user device 120 cannot receive wireless network signal 103, user device 120 may deactivate communications to prevent receiving new programming data 101 and/or to prevent outgoing communications. Although outgoing communications may be stopped, user device 120 may continue to forward, to mobile device 110, GPS or other location information identifying a geographic location associated with user device 120.

Access point 152 may include any hardware or software, such as an 802.11a, b or g router, a wireless access point, a wireless adapter, a base station, etc., that acts as a communication hub for connecting user device 120 to wireless network 150. In another example, access point 152 may correspond to an LTE eNodeB base station, a Global System for Mobile Communications (GSM) base station, a Code Division Multiple Access (CDMA) base station, and/or another type of base station. In this example, wireless network 150 may correspond to an LTE, GSM, or CDMA data network.

In certain implementations, user device 120 may measure and analyze a characteristic associated with wireless network signal 103, and user device 120 may use this characteristic to estimate a distance/direct to access point 152. For example, detector 120 may identify a frequency change, a transmission delay, and/or a received portion of wireless network signal 103. In another example, user device 120 may measure a received signal strength of wireless network signal 103. For example, user device 120 may determine a received signal strength indicator (RSSI) value and/or a received channel power indicator (RCPI) value, as defined in IEEE standard 802.11 for wireless local area networks (WLANs). User device 120 may provide an indication of a direction toward access point 152 (e.g., back to an area associated with wireless network 150) if user device 120 crosses network boundary 154. For example user device 120 may indicate a direction associated with stronger signal strengths. In another example, user device 120 may use the measured attribute of wireless network signal 103 to determine if user device 120 is approaching network boundary 154. For example, a distance between user device 120 and access point 152 may be determined using the Friis transmission formula in Equation 1:

$$L = 20 \log_{10}(40\pi d/\lambda) \quad \text{(Eq. 1).}$$

In Equation 1, L corresponds to the signal strength loss in decibels, d corresponds to the distance between user device 120 and access point 152, and λ corresponds to the wavelength of presence message 111. User device 120 may present an alert to a user or to mobile device 110 if a measured signal strength of wireless network signal 103 is below a threshold level.

Although FIG. 1 shows exemplary components of environment 100, in other implementations, environment 100 may include fewer components, different components, differently arranged components, or additional components than those depicted in FIG. 1. For example, wireless network 150 may include multiple access points 152, and user device 120 may attempt to access wireless network signal 103 from a closest one of the access points 152. Additionally or alternatively, one or more components of environment 100 may perform functions described as being performed by one or more other components of environment 100.

Figure 2:
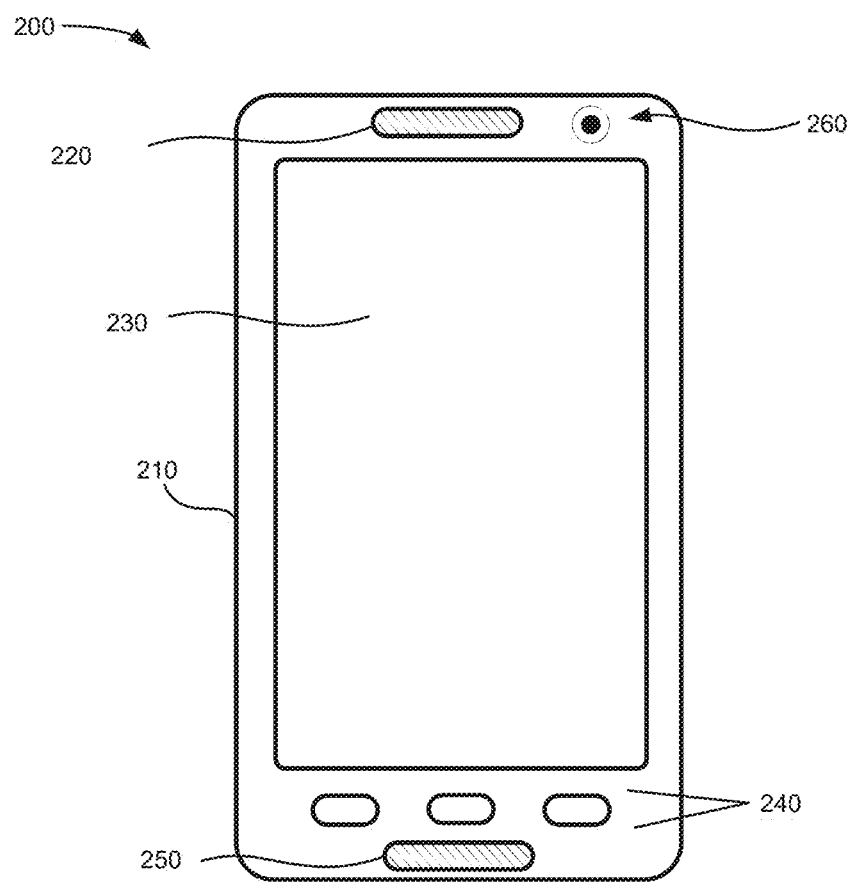
FIG. 2 is a diagram illustrating exemplary components of a mobile device that may be included in the environment of FIG. 1.

FIG. 2 shows an exemplary communications device 200 that may correspond to mobile device 110. As shown in FIG. 2, communications device 200 may include a housing 210, a speaker 220, a display screen 230, control buttons 240, a microphone 250, and/or camera element 260. Housing 210 may include a chassis via which some or all of the components of communications device 200 are mechanically secured and/or covered. Speaker 220 may include a component to receive input signals from communications device 200 and transmit audio output signals, which communicate audible information to a user of communications device 200.

Display screen 230 may include a component to receive input signals and present a visual output in the form of text, images, videos and/or combinations of text, images, and/or videos. In one implementation, display screen 230 may selectively present a portion of programming data 101 and/or present a user interface to receive programming data 101. In one implementation, display screen 230 may display text that is input into communications device 200, text, images, and/or video received from another device, and/or information regarding incoming or outgoing calls or text messages, emails, media, games, phone books, address books, the current time, etc. In one implementation, display screen 230 may correspond to a touch screen that includes a component to detect an input. For example, display screen 230 may include a pressure sensor and to detect touch for inputting content to touch screen 230. Alternatively or additionally, display screen 230 may include a capacitive or field sensor to detect a touch or proximity of the user or an input device to display screen 230.

Control buttons 240 may include one or more buttons that accept, as input, mechanical pressure from the user (e.g., the user presses a control button or combinations of control buttons) and send electrical signals to a processor (not shown) that may cause communications device 200 to perform one or more operations. For example, control buttons 240 may be used to cause communications device 200 to transmit information.

Microphone 250 may include a component to receive audible information from a user and send, as output, a signal transmitted to another user device, or cause the device to perform one or more operations. In one implementation, microphone 250 may capture audio data from an associated user, and communications device 200 may convert the audio data (e.g., by performing a speech-to-text conversion) into a portion of programming data 101.

Camera element 260 may be provided on a front or back side of communications device 200, and may include a component to receive, as input, optical signals and send, as output, a digital image or video that can be, for example, viewed on touch screen 230, stored in the memory of communications device 200, discarded and/or transmitted to another communications device 200. In one implementation, camera element 260 may capture image data, and communication device 200 may identify a portion of programming data 101 (e.g., a serial number associated with user device 120, an SSID and/or WPA code associated with access point 152, etc.) based on the captured image data.

Figure 3:
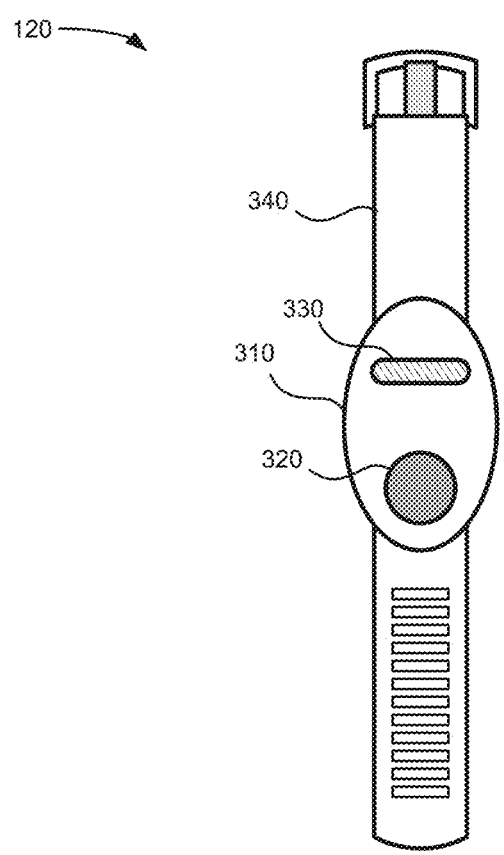
FIG. 3 is a diagram illustrating exemplary components of a mobile device that may be included in the environment of FIG. 1.

FIG. 3 shows an exemplary wearable device 300 that may correspond to user device 120. As shown in FIG. 3, wearable device 300 may include a housing 310, a control button 320, a speaker/microphone 330, and/or fastening element 340. Housing 310 may include a chassis via which some or all of the components of wearable device 300 are mechanically secured and/or covered.

Control button 320 may include a structure to accept, as an input, mechanical pressure from the user (e.g., the user presses control button 320) and send signals to a processor (not shown) that may cause wearable device 300 to perform one or more operations. For example, control button 340 may be used to initiate a communication to a device identified in programming data 101.

Speaker/microphone 330 may include a component to receive input signals from wearable device 300 and transmit audio signals for presenting audible information to a user of wearable device 300. Speaker/microphone 330 may also include a component to receive audible information from a user and send, as output, an electrical signal that may be transmitted to another user device, or cause the device to perform one or more operations.

Fastening element 340 may include a component that may be used to affix wearable device 300 to an associated user. For example, fastening element 340 may include a strap or a band and a buckle to hold wearable device 300 on a wrist of a user.

Thus, in comparison to communications device 200, wearable device 300 may include limited input and/or output functionality. For example, in some implementations, wearable device 300 may not include a keypad/key pad, touch screen or other input features. In other implementations, wearable device 300 may not include a display screen to present data to a user. In still other implementations, wearable device 300 may not be able to output data to acknowledge receipt and/or acceptance of programming data 101.

Although FIG. 3 depicts exemplary components of wearable device 300, in other implementations, wearable device 300 may include fewer components, additional components, different components, or differently arranged components than illustrated in FIG. 3. Furthermore, one or more components of wearable device 300 may perform one or more tasks described as being performed by one or more other components of wearable device 300. For example, wearable device 300 may include an interface to couple to a wireless router or other type of access device to receive local network signal 102 and/or wireless network signal 103. Wearable device 300 may include a sensor to collect information regarding a wearer such as a heart rate, blood pressure, blood composition (oxygen, glucose, etc.) temperature, skin conductivity, etc. Wearable device 300 may further include a sensor to collect information regarding a surrounding environmental condition, a temperature, altitude, barometric pressure, etc.

Figure 4:
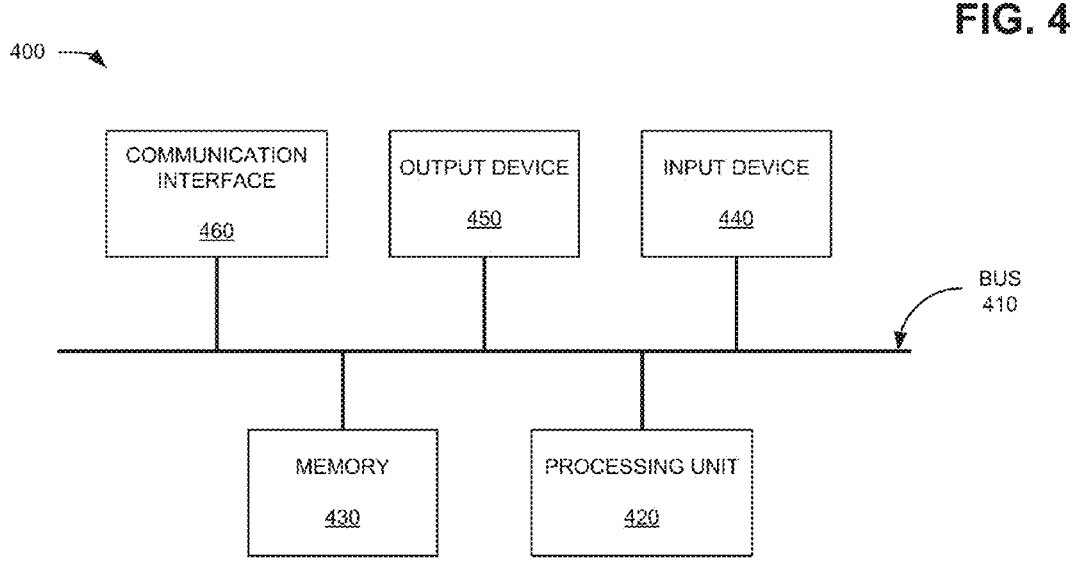
FIG. 4 is a diagram illustrating exemplary components of a user device that may be included in the environment of FIG. 1.

FIG. 4 is a diagram illustrating exemplary functional components of device 400 according to an implementation described herein. Mobile device 110, user device 120, network node 132, bank end device 134, access point 152, or another component of network 130, local network 140, and/or wireless network 150 may each include one or more devices 400. As shown in FIG. 4, device 400 may include a bus 410, a processing unit 420, a memory 430, an input unit 440, an output unit 450, and a communication interface 460.

Bus 410 may include a path that permits communication among the components of device 400. Processing unit 420 may include any type of single-core processor, multi-core processor, microprocessor, latch-based processor, and/or processing logic (or families of processors, microprocessors, and/or processing logics) that interprets and executes instructions. In other embodiments, processing unit 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processing unit 420, and/or any type of non-volatile storage device that may store information for use by processing unit 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input unit 440 may allow an operator to input information into device 400. Input unit 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input unit 440. In other words, device 400 may be "headless" and may not include a keyboard, for example.

Output unit 450 may output information to an operator of device 400. Output unit 450 may include a display, a printer, a speaker, and/or another type of output device. For example, device 400 may include a display, which may include a liquid-crystal display (LCD) for displaying content to the customer. In some embodiments, device 400 may be managed remotely and may not include output unit 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals.

Communication interface 460 may include and/or may be coupled to an antenna for transmitting and receiving RF signals. For example, communication interface 460 may be coupled to an antenna assembly that includes one or more antennas to transmit and/or receive RF signals. The antenna assembly may, for example, receive data from communication interface 460 and transmit RF signals associated with the data (e.g., programming data 101 and/or local network signal 102), or the antenna assembly may receive RF signals (e.g., wireless network signal 103) and provide them to communication interface 460 to be processed.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

As will be described in detail below, device 400 may perform certain operations, and device 400 may perform these operations in response to processing unit 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processing unit 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than those depicted in FIG. 4. Additionally or alternatively, one or more components of device 400 may perform one or more tasks described as being performed by one or more other components of device 400.

Figure 5:
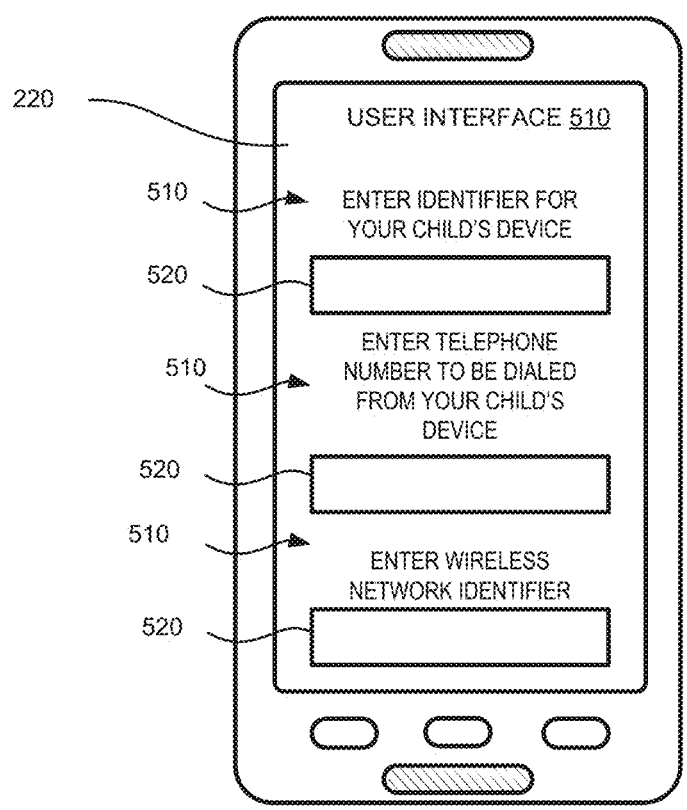
FIG. 5 shows an exemplary user interface that may be presented by a device in the environment of FIG. 1.

FIG. 5 is a diagram illustrating an exemplary user interface 500 that may be presented by mobile device 200 (e.g., via display screen 220) in connection with collecting a portion of programming data 101. As shown in FIG. 5, user interface 500 may be a graphical user interface (GUI) that includes one or more input prompts 510 and one or more input fields 520 to receive input from a user. Input prompt 510 may direct a user input data to be included in programming data 101 and/or used to obtain a portion of programming data 101. Input field 520 may be an area of user interface 500 that is adapted to receive a user input. Additionally or alternatively, input field 520 may include a drop down menu or other graphical element for receiving a user input.

Input prompt 510 may direct a user to enter data that may be used by user device 120 to verify that programming data 110 is being sent from mobile device 110. For example, input prompt 510 may direct the user to enter an identifier for user device 120 (as shown in FIG. 5), and this identifier may include a serial number associated with user device 120, an MDN or other telephone number associated with user device 120, a pass code, etc. As shown in FIG. 5, user interface 500 may also include input prompt 510 that directs a user to enter data identifying a telephone number, such as an MDN associated with a device that may be dialed by user device 120 (e.g., based on a user selection of control button 320).

Another input prompt 510 in user interface 500 may direct a user to enter an identifier such as an SSID or other attribute associated with wireless network 150. In another example, mobile device 110 may receive, via user interface 500, information identifying a location (e.g., GPS coordinates; a name of a business, school, organization, etc. at the location; and/or the name of a wireless network 150 at the location). Mobile device 110 may use this information to identify an attribute (e.g., the SSID) associated with wireless network 150. For example, mobile device 110 may access a database, website, search engine, etc. to determine one or more attributes of wireless network 150.

Mobile device 110 may populate programming data 101 based on user data submitted via input fields 520. Mobile device 110 may further access additional data and include this additional data in programming data 101. For example, mobile device 110 may automatically (e.g., without receiving a user input) determine information identifying a telephone number, such as an MDN associated with mobile device 110, and/or an SSID and/or other data associated with local network provided or managed by mobile device 110. Mobile device 110 may then include the determined information in programming data 101 along with data submitted via user interface 500.

Although FIG. 5 shows exemplary elements of user interface 500, in other implementations, user interface 500 may include fewer elements, different elements, additional elements, or differently arranged elements than those depicted in FIG. 5. Additionally or alternatively, one or more elements of user interface 500 may perform one or more tasks described as being performed by one or more other elements of user interface 500.

Figure 6:
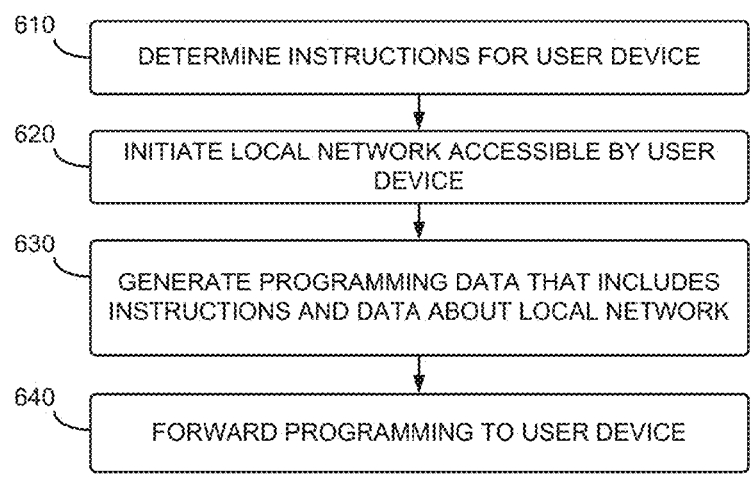
FIG. 6 is a flowchart of a process for generating and forwarding programming data in the environment of FIG. 1.

FIG. 6 is a flowchart of a process 600 of providing programming data 101 according to an implementation described herein. In some implementations, process 600 may be performed by mobile device 110. In other implementations, some or all of process 600 may be performed by another device or a group of devices separate from and/or including mobile device 110.

Process 600 may include receiving a programming instruction (block 610). For example, as shown in FIG. 5, mobile device 110 may present a user interface to receive data relates to a programming instruction, such as a MDN associated with a number to be dialed from user device 120 and/or an data associated wireless network 150 (such as an identifier, an SSID, location etc.) that may be used to geographically limit the operation of user device 120. After receiving the programming instructions, mobile device 110 may establish local network 130 (block 620). For example, mobile device 110 may provide for a mobile hotspot to tether user device 120 to mobile device 110. When tethered to mobile device 110, user device 120 can access a data connection (e.g., Internet access) of mobile device 110 (e.g., a data connection via network 130). Mobile device 110 may provide the tethering with user device 110 over wireless LAN using Wi-F), over Bluetooth or by physical connection using a cable, such as a universal serial bus (USB).

As shown in FIG. 6, process 600 may further include generating programming data 101 that includes the programming instructions and data about local network 140 (block 630). For example, mobile device 110 may include, in programming data 101, information identifying a number (e.g., MDN) that can be dialed by user device 120 and/or an SSID associated with wireless network 150. Additionally, programming data 101 may include data identifying a time period when the MDN and/or the SSID for wireless network 150 should be used by user device. For example, programming data 101 may include an indication that a first MDN, associated with mobile device 110 should be used (e.g., enabled to be dialed by user device 120) during a first time period (e.g., during work hours) and a second MDN for a different device should be used by user device 120 during a second, different time period. In another example, programming data 101 may include data identifying when the SSID for wireless network 150 should be used by user device 120. For example, if wireless network 150 corresponds to an amusement park, programming data 101 may include an indication that the SSID for wireless network 150 should be used by user device 120 during a certain time period when an associated user is visiting the amusement park.

Programming data 101 may further include authentication data. For example, programming data 101 may further include data identifying the SSID and/or other attributes associated with local network 140 generated and/or managed by mobile device 110. Programming data 101 may further include other authentication information, such as a passcode, a serial number for user device 120, a MDN for user device 120, etc.

Continuing with FIG. 6, process 600 may further include forwarding the programming data 101 to user device 120 (block 640). For example, mobile device 110 may generate an SMS message or other communication to forward programming data 101, and mobile device 110 may forward the communication to user device 110 via network 130. In another implementation, mobile device 110 may send some instructions, as programming data 101, via network 130, and other programming instructions via another message and/or via local network 140. For example, programming data 101 include data indentifying the SSID for local network 140 and may prompt user device to access mobile device 110 via local network 140 using the SSID. User device 120 may then interface with mobile device 110 via local network 140 to acquire other programming information, such as an MDN to be dialed out by user device 120 and/or the SSID for wireless network 150. In this example, the additional programming instructions may be carried via local network signal 102.

In another example, programming data 101 include data indentifying the SSID for wireless network 150 and may prompt user device to interface with access point 152 via wireless network 150 using the SSID. User device 120 may then interface with access point 152 via wireless network 150 to acquire other information, such as an instruction to become active when it is located within communications range of access point 152 (e.g., within network boundary 154). In this example, the additional programming instructions may be carried via wireless network signal 103.

FIG. 7 is a flowchart of a process 700 for providing data regarding mobile device 110 to local device 150. In some implementations, process 700 may be performed by user device 120. In other implementations, some or all of process 700 may be performed by another device or a group of devices (e.g., other devices that are not shown in FIG. 1) separate from and/or including user device 120.

As shown in FIG. 7, process 700 may include receiving programming data 101 via a first network (block 710). For example, user device 120 may receive a SMS or other message carrying programming data 101 from network 130. Additionally or alternatively, user device 110 may receive an SMS or other message providing data that enables user device 120 to access programming data 101. For example, the message may identify a device, storage location, web page, IP address, domain, etc. where programming data 101 is stored and/or information (e.g., a pass code) that can be used by user device 120 to access the stored programming data 101. In another example, user device 120 may receive programming data 101 or related information from mobile device 110 via a first communication connection (e.g., Bluetooth®) or via a physical connection such as a USB cable.

In another implementation, user device 120 may receive programming data 101 from mobile device 110 only when mobile device 110 and user device 120 are in proximity to each other. For example, mobile device 110 may provide programming data 101 to user device 120 when mobile device 110 and user device 120 are located at the shared location (e.g., within the same building). In another example, mobile device 110 may provide programming data 101 to user device 120 via a short-range signal or connection, such as a short-range wireless link like Bluetooth®, via WiFi® (e.g., via local network 140), or via a physical cable.

As shown in FIG. 7, process 700 may also include user device 120 parsing programming data 101 to extract data regarding a second network (block 720). For example, user device may extract, from programming data 101, information identifying an SSID or other attributes (e.g., a WPA code) of the second network, such as local network 140. In block 720, user device 120 may further extract other authentication data, such as a pass code, an MDN associated with mobile device 110, a serial number of user device 120, an MDN associated with user device 120, etc. User device 120 may determine whether the authentication data can be verified (block 730). For example, user device 120 may, in block 730, determine whether the authentication data included in programming data matches data previously received and/or stored by user device 120. When user device 120 cannot verify the authentication data (block 730-No), user device 120 may ignore programming data 101 (block 740).

As shown in FIG. 7, when user device 120 can verify the authentication data (block 730—Yes), process 700 may also include user device 120 attempting to connect to the second network using the contents of programming data 101 (block 750). For example, user device 120 may use an SSID or other data associated local network 140 with attempt to tether to mobile device 110 via local network 140. If user device cannot connect to mobile device 110 via local network 140 (block 750-No), user device 120 may ignore programming data 101 (block 740).

If user device 120 connects to mobile device 110 via local network 140 using data identified in programming data 101 (block 750—Yes), user device 120 may execute instructions in programming data 101 (block 760). For example, if programming data 101 identifies an MDN, user device 120 may be programmed to dial out to the identified MDN. For example, user device 120 may be programmed so that a user selection of control button 320 causes user device 120 to dial the identified MDN.

As shown in FIG. 7, process 700 may further include user device 120 determining whether programming data 101 includes information associated with a third boundary network (block 770). For example, user device 120 may determine whether programming data 101 includes data identifying an SSID or another attribute of wireless network 150. If programming data 101 includes information associated with the third boundary network (block 770—Yes), user device 120 may deactivate itself if a connection to the third network is lost (block 780). For example, if user device 120 cannot receive wireless network signal 103 from access point 152 (e.g., user device 120 moves outside of network boundary 154), user device 120 will not dial out to a specific MDN when control button 320 is pressed. In another example, user device 120 may, instead of deactivating itself, may deactivate certain features, such as deactivating communications, while continuing to perform other functions, such as reporting a position of user device 120 and/or reporting other sensor readings regarding ambient conditions (e.g., temperature, light levels, orientations) or about a user (e.g., heart rate, body temperature, etc.). In yet another example, user device 120 may perform a particular function when if the connection to the third network is lost, such as forwarding an alert message to mobile device 110 or another device identified in programming data 101.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6-7, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
generating, by a processor associated with a first device, instructions for a second device, wherein the instructions include an identification of a third device to which the second device is authorized to initiate a voice call and an indication of a time period during which the second device is authorized to initiate the voice call to the third device;
initiating, by the processor, a first network, wherein the first network is associated with first network data, and wherein the first network data enables the second device to communicate with the first device via the first network when the first device is within a threshold distance of the second device;
generating, by the processor, programming data identifying the instructions and the first network data;
forwarding, by the processor, the programming data to the second device via a second network that differs from the first network, wherein the second device parses the programming data to obtain the instructions and the first network data, wherein the second device attempts to communicate with the first device via the first network using the first network data, wherein the second device executes the instructions when the second device is able to communicate with the first device via the first network, and wherein the second device is able to initiate the voice call to the third device when the second device is able to communicate with the first device via the first network and when a current time is within the time period; and
communicating, by the processor, with the second device via the first network.

2. The method of claim 1, wherein the first network includes a Wi-Fi network, and wherein the first network data includes a service set identifier (SSID) associated with the Wi-Fi network.

3. The method of claim 1, wherein the instructions cause the second device to be programmed to selectively communicate with the third device.

4. The method of claim 3, wherein the instructions identify a mobile device number (MDN) associated with the third device, and wherein the second device uses the MDN to communicate with the third device.

5. The method of claim 1, wherein the instructions identify third network data associated with a third network, wherein third network data enables the second device to access the third network when the second device is located within a boundary of the third network.

6. The method of claim 5, wherein the third network includes a wireless network, and wherein the third network data includes a service set identifier (SSID) associated with the wireless network.

7. The method of claim 5, wherein the instructions cause the second device to become deactivated when the second device is not located within the boundary of the third network.

8. A device comprising:
a memory configured to store instructions; and
a processor configured to execute one or more of the instructions to:
generate programming instructions for another device, wherein the instructions include an indication of a particular device to which the other device is authorized to initiate a voice call and an indication of a time period during which the other device is authorized to initiate the voice call to the particular device;
initiate a first network, wherein the first network is associated with first network data, and wherein the first network data enables the other device to access the first network when the other device is within a threshold distance of the device;
generate programming data identifying the programming instructions and the first network data;
forward the programming data to the other device via a second network that differs from the first network, wherein the other device parses the programming data to obtain the programming instructions and the first network data, wherein the other device attempts to communicate with the device via the first network using the first network data, wherein the other device executes the programming instructions when the other device is able to communicate with the device via the first network, and wherein the other device is able to initiate the voice call to the particular device when the other device is able to communicate with the device via the first network and when a current time is within the time period; and
communicate with the other device via the first network.

9. The device of claim 8, wherein the first network includes a Wi-Fi network, and wherein the first network data includes a service set identifier (SSID) associated with the Wi-Fi network.

10. The device of claim 8, wherein the programming instructions cause the other device to selectively communicate with the particular device.

11. The device of claim 10, wherein the programming instructions identify a mobile device number (MDN) associated with the particular device, and wherein the other device uses the MDN to communicate with the particular device.

12. The device of claim 8, wherein the processor, when forwarding the programming data to the other device, is further configured to:
generate a short-message service (SMS) message that includes the programming data; and forward the SMS message to the other device via the second network.

13. The device of claim 8, wherein the programming instructions identify third network data associated with a third network, wherein third network data enables the other device to access the third network when the other device is located within a boundary of the third network.

14. The device of claim 13, wherein the third network includes a wireless network, and wherein the third network data includes a service set identifier (SSID) associated with the wireless network.

15. The device of claim 13, wherein the programming instructions cause the other device to become deactivated when the other device cannot access the third network using the third network data.

16. A non-transitory computer-readable medium configured to store instructions, the instructions comprising:
one or more instructions that, when executed by a processor associated with a first device, cause the processor to:
generate programming instructions for a second device, wherein the instructions include an indication of a third device to which the second device is authorized to initiate a voice call and an indication of a time period during which the second device is authorized to initiate the voice call to the third device;
initiate a first network, wherein the first network is associated with first network data, and wherein the first network data enables the second device to access the first network when the second device is within a threshold distance of the first device;
generate programming data identifying the programming instructions and the first network data;
forward the programming data to the second device via a second network that differs from the first network, wherein the second device parses the programming data to obtain the programming instructions and the first network data, wherein the second device attempts to communicate with the first device via the first network using the first network data, wherein the second device executes the programming instructions when the second device is able to communicate with the first device via the first network, and wherein the second device is able to initiate the voice call to the third device when the second device is able to communicate with the first device via the first network and when a current time is within the time period; and
communicate with the second device via the first network.

17. The non-transitory computer-readable medium of claim 16, wherein the first network includes a wireless network, and wherein the first network data includes a service set identifier (SSID) associated with the wireless network.

18. The non-transitory computer-readable medium of claim 16, wherein the third device is the same as the first device, wherein the programming instructions identify a mobile device number (MDN) associated with the first device, and wherein the programming instructions enables the second device to selectively communicate with the first device using the MDN.

19. The non-transitory computer-readable medium of claim 16, wherein the one or more instructions, when causing the processor to forward the programming data to the second device, further cause the processor to:
generate a short-message service (SMS) message that includes the programming data; and
forward the SMS message to the second device via the second network.

20. The non-transitory computer-readable medium of claim 16, wherein the programming instructions identify an attribute associated with a third network, wherein the second device accesses the third network based on the attribute when the first device is located within a boundary of the third network, and wherein the programming instructions cause the second device to become deactivated when the second device cannot access the third network.

* * * * *